(12) United States Patent
Milligan et al.

(10) Patent No.: US 8,762,418 B1
(45) Date of Patent: Jun. 24, 2014

(54) METADATA THAT ALLOWS REFILTERING AND DATA RECLASSIFICATION WITHOUT ACCESSING THE DATA

(75) Inventors: Charles A. Milligan, Golden, CO (US); Gerald O'Nions, Toulouse (FR)

(73) Assignee: Oracle America, Inc., Redwood City, CA (US)

( * ) Notice: Subject to any disclaimer, the term of this patent is extended or adjusted under 35 U.S.C. 154(b) by 969 days.

(21) Appl. No.: 11/443,988

(22) Filed: May 31, 2006

(51) Int. Cl.
  *G06F 17/30* (2006.01)
  *G06Q 30/02* (2012.01)
(52) U.S. Cl.
  CPC ............... *G06F 17/30722* (2013.01)
  USPC .......................................... 707/802; 705/1.1
(58) Field of Classification Search
  None
  See application file for complete search history.

(56) References Cited

U.S. PATENT DOCUMENTS

| | | | |
|---|---|---|---|
| 6,148,312 A | 11/2000 | Paik et al. | |
| 6,253,217 B1 | 6/2001 | Dourish et al. | |
| 6,411,685 B1* | 6/2002 | O'Neal | 379/88.14 |
| 6,493,731 B1 | 12/2002 | Jones et al. | |
| 6,532,527 B2 | 3/2003 | Selkirk et al. | |
| 6,535,868 B1* | 3/2003 | Galeazzi et al. | 707/2 |
| 6,598,046 B1 | 7/2003 | Goldberg et al. | |
| 6,732,090 B2 | 5/2004 | Shanahan et al. | |
| 6,735,583 B1* | 5/2004 | Bjarnestam et al. | 707/2 |
| 6,760,721 B1* | 7/2004 | Chasen et al. | 707/3 |
| 6,804,755 B2 | 10/2004 | Selkirk et al. | |
| 6,839,740 B1 | 1/2005 | Kiselev | |
| 6,898,670 B2 | 5/2005 | Nahum | |
| 6,907,419 B1 | 6/2005 | Pesola et al. | |
| 6,912,537 B2 | 6/2005 | Selkirk et al. | |
| 2001/0056525 A1 | 12/2001 | Selkirk et al. | |
| 2002/0056031 A1 | 5/2002 | Skiba et al. | |
| 2002/0156840 A1 | 10/2002 | Ulrich et al. | |
| 2002/0156891 A1 | 10/2002 | Ulrich et al. | |
| 2002/0183972 A1 | 12/2002 | Enck et al. | |
| 2002/0188711 A1 | 12/2002 | Meyer et al. | |
| 2003/0014335 A1 | 1/2003 | Lecheler-Moore | |
| 2003/0051113 A1 | 3/2003 | Beardsley et al. | |
| 2003/0061201 A1 | 3/2003 | Grefenstette et al. | |
| 2003/0110272 A1 | 6/2003 | du Castel et al. | |
| 2003/0135765 A1 | 7/2003 | Hind et al. | |
| 2003/0195887 A1 | 10/2003 | Vishlitzky et al. | |
| 2004/0019846 A1 | 1/2004 | Castellani et al. | |
| 2004/0083404 A1 | 4/2004 | Subramaniam et al. | |
| 2004/0139098 A1 | 7/2004 | Margolus et al. | |
| 2004/0153844 A1 | 8/2004 | Ghose et al. | |
| 2004/0194025 A1 | 9/2004 | Hubert et al. | |
| 2004/0268070 A1 | 12/2004 | Hasegawa | |
| 2005/0015685 A1 | 1/2005 | Yamamoto | |
| 2005/0022114 A1 | 1/2005 | Shanahan et al. | |
| 2006/0004691 A1* | 1/2006 | Sifry | 707/1 |
| 2006/0036640 A1* | 2/2006 | Tateno et al. | 707/102 |
| 2006/0117048 A1* | 6/2006 | Thind et al. | 707/101 |
| 2006/0123406 A1* | 6/2006 | Sudhi et al. | 717/168 |
| 2006/0163338 A1* | 7/2006 | Allen et al. | 235/375 |
| 2007/0027861 A1* | 2/2007 | Huentelman et al. | 707/5 |

(Continued)

*Primary Examiner* — Tarek Chbouki

(74) *Attorney, Agent, or Firm* — Brooks Kushman P.C.

(57) ABSTRACT

A method for reclassifying stored objects without the need to re-access or evaluate directly such objects comprises receiving an object to be stored in a storage system and then associating metadata with the object. The metadata is then stored in a data storage system. The metadata is subsequently used to create a plurality of classification recommendations associated with the object. A storage system implementing the methods of the invention includes one or more physical storage means and a controller that executes one or more steps of the invention.

12 Claims, 5 Drawing Sheets

(56) References Cited

U.S. PATENT DOCUMENTS

| | | | |
|---|---|---|---|
| 2007/0033594 A1* | 2/2007 | Allen et al. | 719/318 |
| 2007/0130208 A1* | 6/2007 | Bornhoevd et al. | 707/104.1 |
| 2007/0143370 A1* | 6/2007 | Bushmitch et al. | 707/204 |
| 2007/0143390 A1* | 6/2007 | Giambalvo et al. | 709/200 |
| 2007/0208711 A1* | 9/2007 | Rhoads et al. | 707/3 |
| 2007/0220061 A1* | 9/2007 | Tirosh et al. | 707/200 |
| 2008/0005194 A1* | 1/2008 | Smolen et al. | 707/202 |
| 2008/0060051 A1* | 3/2008 | Lim | 726/1 |
| 2008/0109242 A1* | 5/2008 | Shear et al. | 705/1 |

* cited by examiner

METADATA THAT ALLOWS REFILTERING AND DATA RECLASSIFICATION WITHOUT ACCESSING THE DATA

BACKGROUND OF THE INVENTION

1. Field of the Invention

The present invention relates to methods and object storage systems that allow re-filtering and re-classification of one or more objects via metadata without directly accessing the object associated with the metadata.

2. Background Art

Currently, there is much interest in storage systems that can be used to store a variety of objects. Such systems may, for example, be used to store digital data, analog data, objects de art, manufactured components, paper documents, other forms of storage media such as magnetic tape, optical disk, holographic storage, and the like. Therefore, in the context of data storage systems, Information Lifecycle Management ("ILM") approaches, including data archive techniques, resource management techniques, and data warehousing, typically use a data classification mechanism with data entities such as data objects in object based storage, files in file systems, data sets in mainframe systems, or table or matrix subsets of a database.

In such storage systems, the common management approach is to use a classification system, i.e., when data objects are first received in the storage system, they are individually added to some classification grouping. When one of the other stored objects delineated above (e.g., a painting—object de art) are added to a storage system intended to manage such objects, it is also generally placed in the system according to some consistent classification system. Common archive and compliance data storage solutions invoke a data management approach classifying data objects individually into specific classifications.

The current art is based on a technique that uses a filter to process the data and other system metadata about the object in order to identify the preferred specific classification for a particular object. The filtering process must resolve classification ambiguity problems where there are many almost equivalent potential class assignments for any particular data object. However, a minor change in the focus of the business could drive a significant change in the filtering process (and thus results) which in turn could actually require every object in the system to be read again and reclassified for correct system operation. Today this would be an overwhelming performance problem. Current systems avoid this problem rather than solving it.

Accordingly, there exists a need in the prior art for improved methods and systems for filtering and reclassifying stored data.

SUMMARY OF THE INVENTION

The present invention solves one or more problems of the prior art by providing in one embodiment a method for reclassifying stored objects without the need to re-access and re-evaluate such objects. The method of this embodiment comprises receiving an object to be stored in a storage system and then associating metadata with the object. The metadata can be received from outside the storage system with or independent of the received object and/or it can be generated within the storage system. The metadata is stored in a data storage system part of or associated with the object storage system. Advantageously, the metadata is used to create a plurality of classification recommendations associated with each object.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

The term "object" as used herein "object" refers to an entity received from a user or using system to be stored and managed by the object storage system that is identified to the storage system and the user or using system by a unique identifier such as a name, a handle, or an address. Such entities to be stored include physical objects (e.g., manufacturing components, paintings, bottles of wine, cases of produce, assembled units like cars or disk drives, etc.), electronic objects (e.g., digital data files, digital blocks of data, analog data entities, etc.), and logical and virtual entities managed by virtualizing storage systems.

The term "primary digital data" as used herein means data received by a data storage system from a using system that is specifically known to both systems via an agreed upon identifier. Such data is to be stored in and managed by the data storage system and is in turn an example of a stored object.

Figure 1:
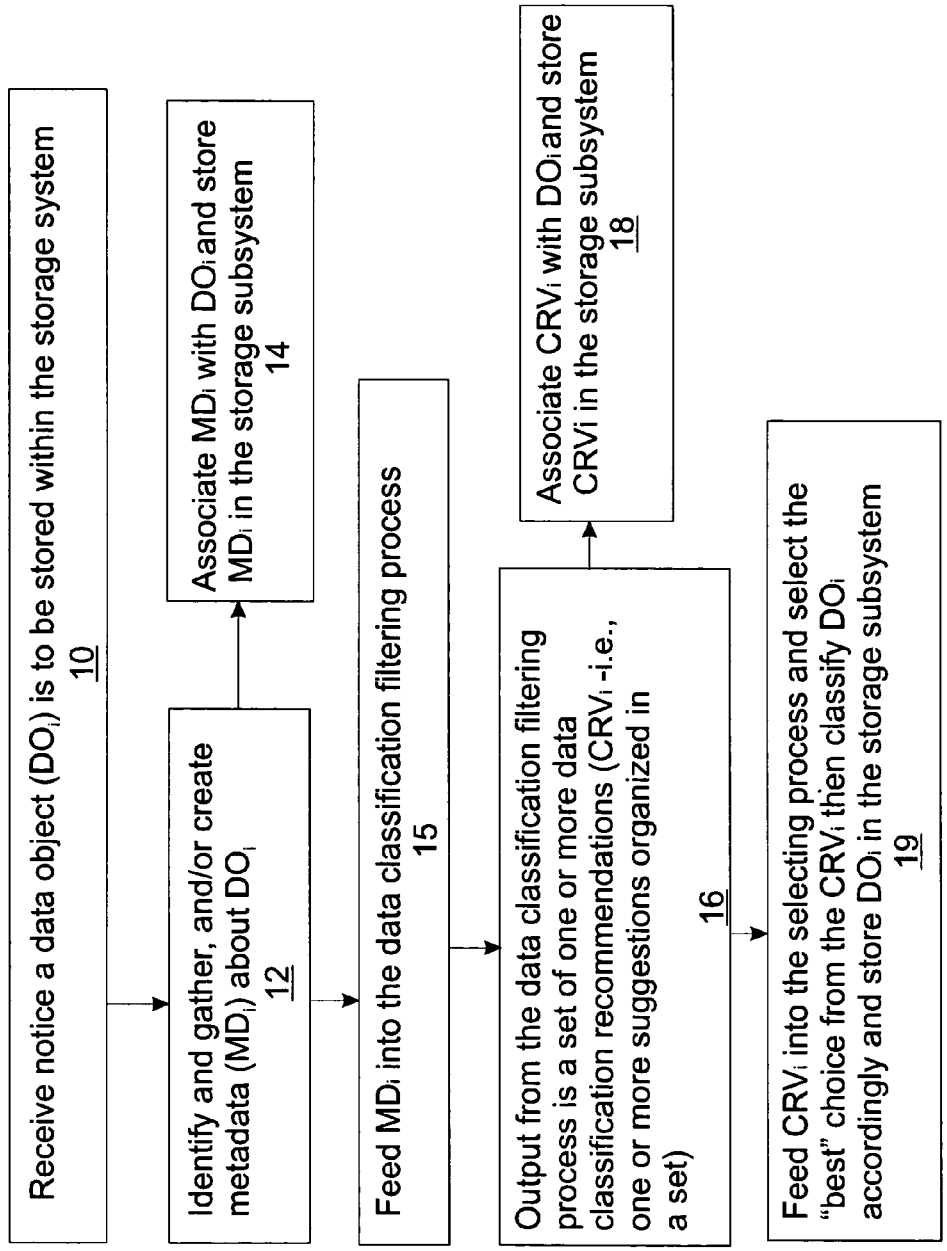
FIG. 1 is a flowchart illustrating an embodiment of the present invention in which primary digital data is classified from the metadata without necessarily requiring the system to directly access the primary digital data.

In an embodiment of the present invention, a method of classifying stored objects (in this example the stored objects are instances of primary digital data) without directly accessing the stored object is provided. With reference to FIG. 1, a flowchart illustrating the method of this embodiment is provided. FIG. 1 provides the initial object classification. A digital data storage system receives a data object to be stored in a data storage system as indicated in Box 10. Metadata is then associated with the data object (Box 12). Next, the metadata is stored in a storage device contained in or associated with the data storage system as shown in Box 14. The metadata is subsequently fed into a data classification filtering system (Box 15) where it is used to classify the data objects by creating a set of one or more classification recommendations that are associated with the data object (Box 16). It should be appreciated that the method of this embodiment uses a staged filtering process that reviews the data and creates metadata for input to a filter process. The filter process returns not just a single recommendation for data object classification (i.e., the best classification or closest match), but an organized set of one or more recommendations (e.g., a prioritized set, a set organized in a structure such as a tree or a hierarchy, a relationship organization of the various recommendations, or some combination of more than one type of organization of classification recommendations). The set or vector of classification recommendations is associated with the data object and stored in the storage subsystem (Box 18). Finally the best choice is made for the current classification of the data object via a selection process using the set of recommendations (Box 19). The output to storage includes the data object and independently also includes the classification recommendations and the metadata used by the filter to create the classification recommendations. Later, in the case where re filtering is advised (e.g., a change in the filter itself), re filtering can be executed without any re access of the data. Classification recommendations are defined using algorithms that process metadata that is generated as the data objects themselves are processed (e.g., content summarizations) and also include environmental and static metadata such as object names, using context, creation environment and other accompanying object metadata. The filter process not only gives a score for each of the recommended classes but also retains the metadata input to the filter and output by the filter for each potential classification of the data object. This will allow for processes that advise reclassification for any particular object to access the full ordered solution set from the initial filtering operation at any subsequent time and move the data to the more appropriate class or re evaluate the order of the recommended classifications or actually re filter using the metadata retained.

Figure 2:
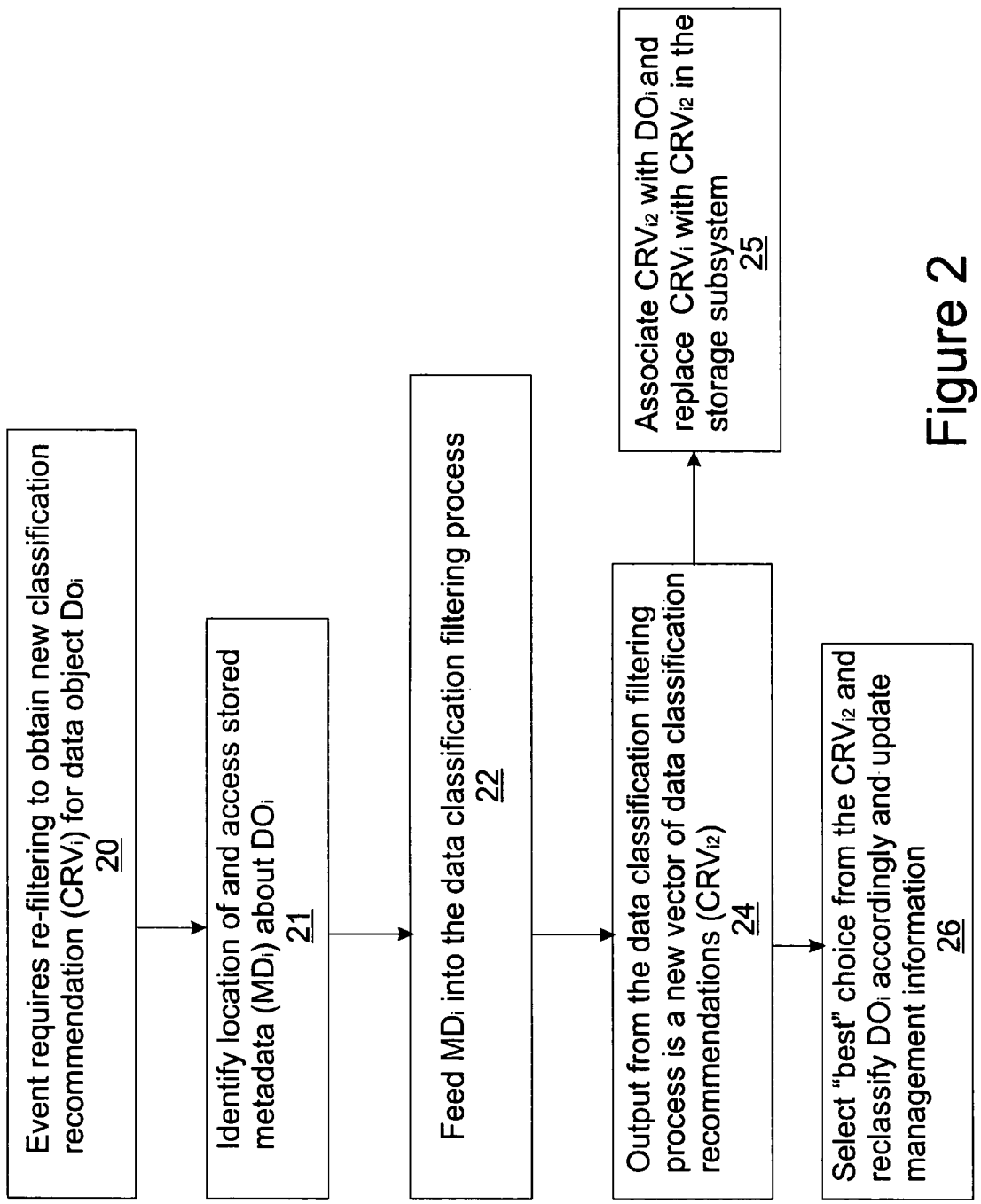
FIG. 2 is a flowchart illustrating an embodiment of the present invention in which primary digital data is reclassified using only metadata without directly accessing the primary digital data.
Figure 3:
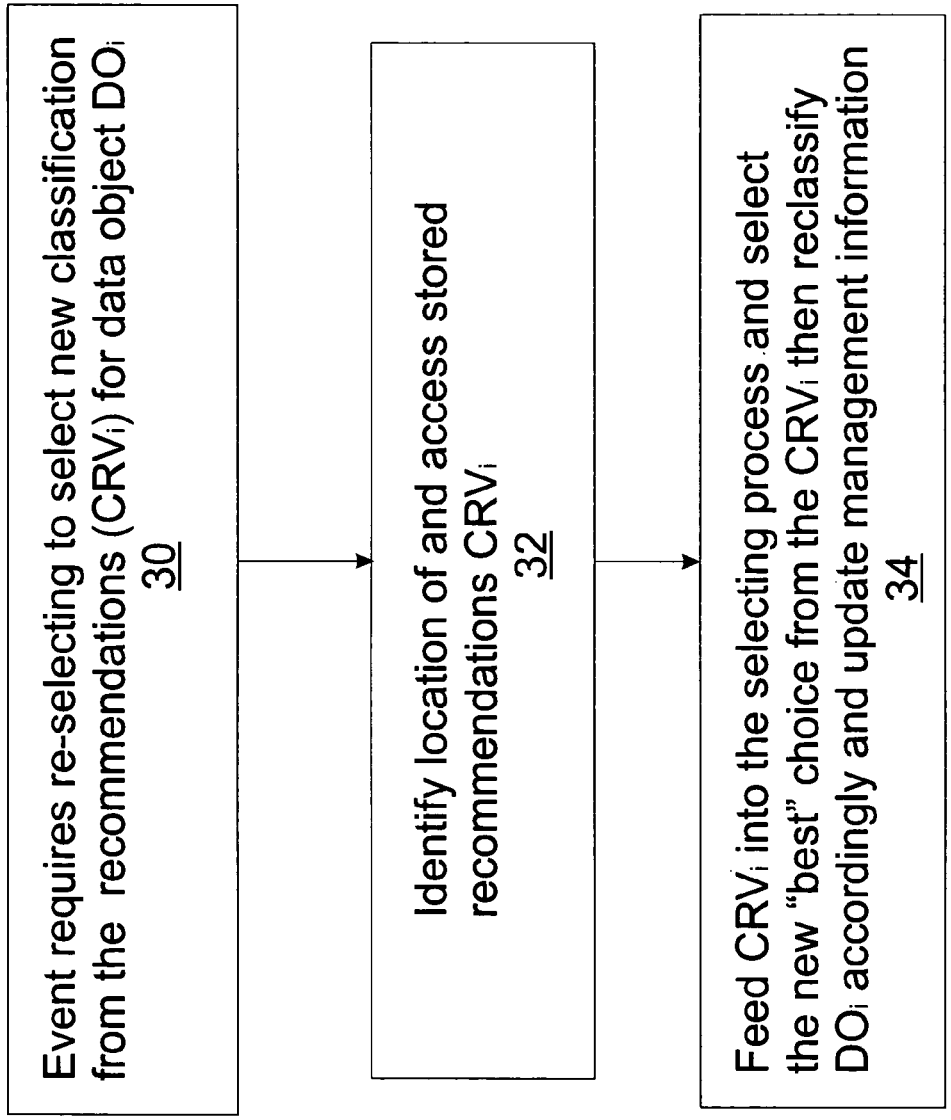
FIG. 3 is a flowchart illustrating an embodiment of the present invention in which primary digital data is reclassified using only the set of previous classification recommendations without directly accessing the primary digital data.
Figure 4:
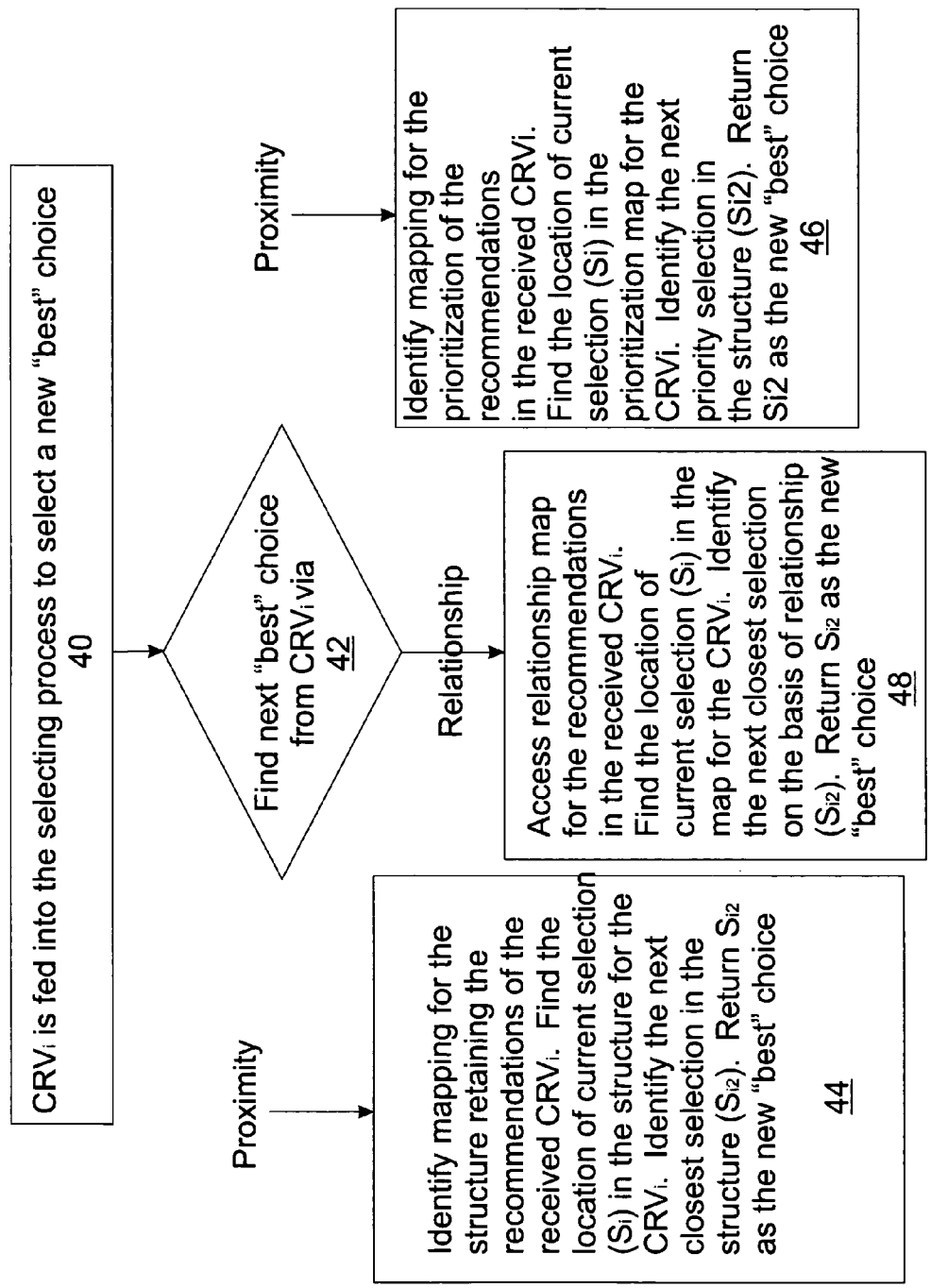
FIG. 4 is a flowchart illustrating an embodiment of the present invention in which the selection for a new classification for primary digital data is made using different algorithms applied to the set of previous classification recommendations without directly accessing the primary digital data.

In a variation of the present embodiment, the plurality of classification recommendations associated with the data object are predetermined and stored away. Then, in response to the occurrence of an event requiring reevaluation of the data suggesting an alternative classification might be called for, the re-classification can be done using the metadata without directly accessing the data object (FIG. 2—Box 20). The event requiring reevaluation may be any type of event that makes data reclassification required or desirable. For example, addition of a product line, elimination of a division, a natural disaster, a change in business direction, and the like. Other examples of events that might drive a need for reclassification include failure of a storage system component, new information received by an enterprise concerning the stored object that is communicated directly to the storage system or may be used to change the filtering system or the classification rules, and the like. A more specific example of such outside the data storage is when a particular stored object (e.g., a painting) is discovered to be a copy or a fake and must be reclassified in the system (i.e., it still has value but not the same as previously thought). One particularly common event is the passage of a predetermined period of time (e.g., this might affect the classification schema applied to wines stored in such a managed storage system). This variation represents a significant advantage over the prior art methods of classifying data in that the primary data need not be re-accessed for classification. Examples of events that may require reclassification of stored objects include, but are not limited to, deletion of the primary classification, creation of a new classification, redefinition of a classification, passage of a predetermined length of time, and the like. The re-classification of the object can be the complete process (FIG. 2) where the metadata is used by the filter, or it can be an abbreviated process (FIG. 3) where the previous classification recommendations are used. In FIG. 2, the stored metadata is accessed (Box 21) and fed into the filter process (Box 22). The output form the filter is a new set of classification recommendations (Box 24) that will replace the previous set of recommendations (Box 25) and from which the new classification will be selected for classifying the data object (Box 26). In the abbreviated process (FIG. 3—Box 30) the event will trigger the accessing of the currently stored set of classification recommendations (Box 32) and feeding this is into the selection process (Box 34) where a new classification is selected as "best" for the data object. The newly selected "best" classification for the data object could indeed be a different one than before used, or could in fact turn out to be reuse of the old classification. In FIG. 4, a number of different mechanisms are explored to select the "best" classification to use for the data object. Once the classification recommendation set (CRV) is fed into the selection process (Box 40), the style of selection is determined (Box 42). The style can be one of the many types, and ordering of the available types, or combinations of more than one type. Some example types are structural (Box 44), via prioritization (Box 46), or relationship based (Box 48).

In another variation of the present embodiment; classification metadata is associated with each classification recommendation of the one or more of the classification recommendations in the set. Advantageously, the classification metadata gives an assessment of the relevance of a particular classification recommendation to the data object or of the relationship of the recommendations to each other, thereby providing a mechanism with which the collection of classification recommendations may be organized. For example, they may be prioritized to form a prioritized set of classification recommendations. Specifically, the one or more classification recommendations to be prioritized can be arranged in a prioritized list in which the recommendations are ranked from a classification most associated with the data object to a classification least associated with the data object. In another refinement of the present variation, the plurality of classification recommendations are arranged in a tree structure, a hierarchy, a loop, an alternating sequence, or various other functional or structural arrangements governed by business requirements or business rules. The organization of the recommendations could also be via a relationship network such as by topic of content most encountered to least encountered.

As set forth above, the method of the present embodiment includes a step in which metadata is associated with the data object. Virtually any type of metadata used to describe the data object is useable, including environmental and static metadata. For example, the metadata may include content summarization of the data object. Other examples of useful metadata for the practice of the invention include, but are not limited to, data object names, using context data, creation environment, and combinations thereof.

Figure 5:
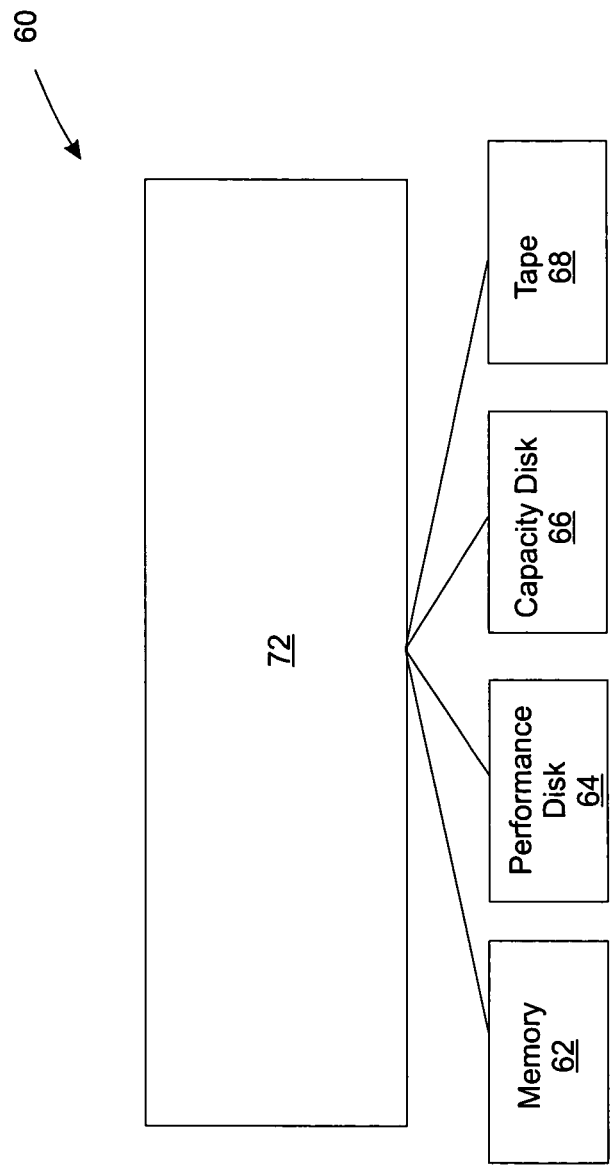
FIG. 5 is a schematic illustration of an embodiment of the digital storage system of the invention.

In yet another embodiment of the present invention, a digital data storage system for classifying and reclassifying is provided. The system of this embodiment implements the methods of the invention as set forth above. With reference to FIG. 5, a schematic of the data storage system is provided. Digital storage system 60 includes one or more data storage devices 62-68 for physically storing digital data. Storage system 60 also includes controller 72 which is operable to perform one or more steps of the methods of the invention. Typically, controller 72 includes one or more computer systems. Such computer systems may be one or more microprocessor-based systems. Specifically, controller 72 is operable to receive an object to be stored in a data storage system, associate metadata with the data object, store the metadata in the data storage system, use the metadata to create a plurality of classification recommendations associated with the data object, and redetermine the plurality of classification recommendations associated with the data object in response to the occurrence of an event requiring reevaluation of the data using the metadata without directly accessing the data object. In a variation of this embodiment, controller 72 is further operable to associate a classification score with each classification recommendation of the plurality of classification recommendations, the classification score providing an assessment of the relevance of a particular classification recommendation to the data object. In another embodiment of the present embodiment, controller 72 is operable to arrange the plurality of classification recommendations in a prioritized list in which the recommendations are ranked from a classification most associated with the data object to a classification least associated with the data object. Moreover, controller 72 is operable to arrange the plurality of classification recommendations in a tree structure. The details of each of the steps performed by controller 72 are the same as that set forth above for the methods of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of classifying stored objects comprising:
for each of a plurality of objects to be stored in a storage system,
  a) associating metadata with the object,
  b) storing the metadata in a data storage system,
  c) using the metadata to create a prioritized set of classification recommendations for the object, wherein the classification recommendations of the prioritized set are arranged in a prioritized list in which the recommendations are ranked from a classification most associated with the object to a classification least associated with the object based on a classification score associated with each of the recommendations and wherein the classification score provides an assessment of the relevance of a particular recommendation to the object,
  d) storing the prioritized set of classification recommendations for the object,
  e) selecting one of the classification recommendations associated with the object to be used as the object classification in the system,
  f) re-determining the prioritized set of classification recommendations for the object in response to the occurrence of an event requiring reevaluation of the object using the metadata without directly accessing the object, and
  g) selecting one of the re-determined classification recommendations for the object to be used as the object classification in the system.

2. The method of claim 1 wherein the event requiring reevaluation comprises an event selected from the group consisting of the passage of a determinable period of time, a specific communication from outside the storage system, a failure of some resource, a modification of the filtering system, a change of rules, a modification of the classification system, and combinations thereof.

3. The method of claim 1 wherein classification metadata is associated with each classification recommendation of the prioritized set of classification recommendations, the classification metadata providing an assessment of the relationship of a particular classification recommendation to the stored object.

4. The method of claim 1 wherein the metadata includes a component selected from the group consisting of content summarizations, statistical assessments, environmental and static metadata, information selected from the group consisting of object names, using context information, creation environment, and combinations thereof.

5. A method of reclassifying primary digital data without directly accessing the primary digital data, the method comprising:
for each of a plurality of data objects to be stored in a data storage system,
  a) associating metadata with the data object,
  b) storing the metadata in the data storage system,
  c) associating a prioritized set of classification recommendations using the metadata associated with the data object, wherein the classification recommendations of the prioritized set are arranged in a prioritized list in which the recommendations are ranked from a classification most associated with the data object to a classification least associated with the data object based on a classification score associated with each of the recommendations and wherein the classification score provides an assessment of the relevance of a particular recommendation to the data object,
  d) storing the prioritized set of classification recommendations associated with the data object,
  e) re-determining the prioritized set of classification recommendations associated with the data object in response to the occurrence of an event requiring reevaluation of the data using the metadata without directly accessing the data object, and
  f) storing the re-determined prioritized set of classification recommendations associated with the data object.

6. A digital data storage system comprising:
one or more data storage devices for physically storing digital data; and
a controller operable to, for each of a plurality of data objects,
  a) associate metadata with the data object,
  b) store the metadata in the data storage system,
  c) use the metadata to create a prioritized set of classification recommendations associated with the data object, wherein the classification recommendations of the prioritized set are arranged in a prioritized list in which the recommendations are ranked from a classification most associated with the data object to a classification least associated with the data object based on a classification score associated with each of the recommendations and wherein the classification score provides an assessment of the relevance of a particular recommendation to the data object,
  d) store the prioritized set of classification recommendations associated with the data object,
  e) re-determine the prioritized set of classification recommendations associated with the data object in response to the occurrence of an event requiring reevaluation of the data using the metadata without directly accessing the data object, and
  f) store the re-determined prioritized set of classification recommendations associated with the data object.

7. The digital data storage system of claim 6 wherein each classification score is reevaluated in step e).

8. The digital data storage system of claim 6 wherein the controller is further operable to arrange the prioritized set of classification recommendations in a tree structure.

9. The digital data storage system of claim 6 wherein the controller comprises one or more computer systems.

10. The digital data storage system of claim 9 wherein the one or more computer systems comprise a microprocessor-based system.

11. A method of classifying stored objects comprising:
for each of a plurality of objects to be stored in a storage system,
 a) associating metadata with the object,
 b) storing the metadata in a data storage system,
 c) using the metadata to create a prioritized set of classification recommendations for the object, wherein the classification recommendations of the prioritized set are arranged in a prioritized list in which the recommendations are ranked from a classification most associated with the object to a classification least associated with the object based on a classification score associated with each of the recommendations and wherein the classification score provides an assessment of the relevance of a particular recommendation to the object,
 d) storing the prioritized set of classification recommendations for the object,
 e) selecting one of the classification recommendations associated with the object to be used as the object classification in the system,
 f) re-determining the prioritized set of classification recommendations for the object in response to the occurrence of an event requiring reevaluation of the object using the stored prioritized set of classification recommendations for the object without directly accessing the object or the metadata, and
 g) storing the re-determined prioritized set of classification recommendations associated with the object.

12. The method of claim 11 wherein the event requiring reevaluation comprises an event selected from the group consisting of the passage of a determinable period of time, a specific communication from outside the storage system, a failure of some resource, a modification of the filtering system, a change of rules, a modification of the classification system, and combinations thereof.

* * * * *